(12) United States Patent
Chen et al.

(10) Patent No.: US 10,436,642 B2
(45) Date of Patent: Oct. 8, 2019

(54) LENS SCANNING MODE HYPERSPECTRAL IMAGING SYSTEM AND ROTOR UNMANNED AERIAL VEHICLE

(71) Applicant: SICHUAN DUALIX SPECTRAL IMAGING TECHNOLOGY CO., LTD., Chengdu, Sichuan (CN)

(72) Inventors: Xinghai Chen, Sichuan (CN); Yelin Liu, Sichuan (CN); Zhihui Huang, Sichuan (CN); Yu Huang, Sichuan (CN)

(73) Assignee: SICHUAN DUALIX SPECTRAL IMAGING TECHNOLOGY CO., LTD., Sichuan (CN)

( * ) Notice: Subject to any disclaimer, the term of this patent is extended or adjusted under 35 U.S.C. 154(b) by 196 days.

(21) Appl. No.: 15/677,492

(22) Filed: Aug. 15, 2017

(65) Prior Publication Data
US 2018/0010964 A1    Jan. 11, 2018

(30) Foreign Application Priority Data
Jun. 20, 2017    (CN) .......................... 2017 1 0468197

(51) Int. Cl.
| | |
|---|---|
| *G01J 3/06* | (2006.01) |
| *G01J 3/28* | (2006.01) |
| *G01J 3/02* | (2006.01) |
| *B64D 47/08* | (2006.01) |
| *B64C 39/02* | (2006.01) |

(52) U.S. Cl.
CPC .............. *G01J 3/06* (2013.01); *B64C 39/024* (2013.01); *B64D 47/08* (2013.01); *G01J 3/0208* (2013.01); *G01J 3/2823* (2013.01); *B64C 2201/123* (2013.01); *G01J 2003/061* (2013.01); *G01J 2003/062* (2013.01); *G01J 2003/2826* (2013.01)

(58) Field of Classification Search
CPC .......... G01J 3/06; G01J 3/0208; G01J 3/2823; G01J 2003/2826; B64D 47/08; G02B 21/26
See application file for complete search history.

(56) References Cited

U.S. PATENT DOCUMENTS

| | | | | |
|---|---|---|---|---|
| 6,006,140 A | * | 12/1999 | Carter | G02B 21/367 382/133 |
| 2010/0014081 A1 | * | 1/2010 | Huening | G01J 3/02 356/328 |
| 2012/0120394 A1 | * | 5/2012 | Chiou | G01J 3/0208 356/302 |

* cited by examiner

*Primary Examiner* — Maurice C Smith

(57) ABSTRACT

A lens scanning mode hyperspectral imaging system and a rotor unmanned aerial vehicle include: an imaging lens, an imaging spectrometer and a surface array detector arranged in sequence and coaxial to a main optic axis, wherein the imaging spectrometer and the surface array detector are connected and mounted to each other; wherein the lens scanning mode hyperspectral imaging system further includes: a driving device for driving the imaging lens to translate relative to a plane where a slit of the imaging spectrometer is. The hyperspectral imaging system of the present invention overcomes the technical bias in the prior art that the imaging lens must be fixed, and the present invention provides relative motion between the target object and the imaging spectrometer by the lens scanning mode for imaging, which solves the image distortion problem of conventional hyperspectral imaging system using a slit scanning mode or a scanning mode.

11 Claims, 3 Drawing Sheets

LENS SCANNING MODE HYPERSPECTRAL IMAGING SYSTEM AND ROTOR UNMANNED AERIAL VEHICLE

CROSS REFERENCE OF RELATED APPLICATION

The present invention claims priority under 35 U.S.C. 119(a-d) to CN 201710468197.5, filed Jun. 20, 2017.

BACKGROUND OF THE PRESENT INVENTION

Field of Invention

The present invention relates to a technical field of rotor unmanned aerial vehicle hyperspectral imaging, and more particularly to a lens scanning mode hyperspectral imaging system and a rotor unmanned aerial vehicle.

Description of Related Arts

Hyperspectral technology is a newly-developed interdisciplinary subject, which is based on technologies such as sensors and computers, and is relative to electromagnetic wave theory, spectroscopy and chroma, physical/geometric optics and other disciplines. Electromagnetic wave theory is the physical basis of remote sensing technology, wherein the interaction mechanism between electromagnetic wave and surface matter, and the transmission model of electromagnetic wave in different media and its receiving as well as analysis are the core of various disciplines and technologies. According to the different spectral characteristics of different objects, hyperspectral images can be used to distinguish and identify features. Therefore, the hyperspectral images can be widely used in atmospheric detection, medical diagnosis, material classification and target recognition, land resources, ecology, environmental monitoring and urban remote sensing. Hyperspectral remote sensing refers to the remote sensing science and technology with high spectral resolution. The imaging spectrometer used in imaging spectroscopy can obtain many very narrow and continuous image data in the ultraviolet, visible, near-infrared and short-wave infrared regions of the electromagnetic spectrum. The imaging spectrometer provides spectral information of tens to hundreds of narrow bands for each pixel, thereby forming a complete and continuous spectral curve.

The imaging spectrometer works by means of that a line information of an object is captured by the plane array detector through the lens array, so as to obtain a one-dimensional image and the corresponding spectral information, and when the electronically controlled mobile platform (or conveyor belt) drives the sample to move continuously, a continuous one-dimensional image of the sample object and real-time spectral information are obtained. Alternatively, a continuous one-dimensional image of the target can be obtained when the scanning mirror is rotated. In such processes, all the data will be recorded by the computer software, and finally get a three-dimensional data cube containing imaging information and spectral information.

The hyperspectral imaging system is a system that combines the imaging spectrometer and the plane array detector in a complete manner. The imaging system forms an image of one line of the target for each time, and the incident light entering the slit is split by the imaging spectrometer, wherein the spectroscope splits each spectral component to correspond to a pixel on a line array of the plane array detector. Thus, each image structure from the plane array detector includes a line array of pixels on a dimension (spatial axis) and a spectral distribution (intensity of light in the spectral element) on another dimension (spectral axis). In order to present all images of a target object in the plane array detector, a relative movement is needed between the target object and the imaging system. In this way, the three-dimensional hyperspectral data cube of the target object can be obtained by moving the sample or by a translation mechanism or by rotating the scanning mirror.

The scanning mode of hyperspectral imaging system mainly contains a slit scanning mode and a rotary mirror scanning mode. In the slit scanning mode, the imaging spectrometer and the plane array detector are combined and fixed on the two-dimensional translation scanning mechanism. The imaging lens is fixed on the package shell alone. The slit scanning mode can only show one line info of the target object at one time. The relative motion between the spectral spectrometer and the plane array detector and the imaging lens, which is moved by the translational mechanism, completes the splicing of the image. In the rotary mirror scanning mode, the imaging lens, the imaging spectrometer and the plane array detector are integrated together and fixed in the system without any relative movement between the three. The rotary mirror scanning mode also can only show one line info of the target object at one time. By arranging a rotary scanning mirror in front of the imaging lens, the incident beam is turned into the lens by the mirror and then passed through the imaging spectrometer. Finally, the image of the object is measured and presented on the plane array detector.

Conventionally, for hyperspectral image acquisition with an unmanned aerial vehicle, an imaging device is mounted on a fixed-wing aircraft, and flight of the aircraft is a translation mechanism of the system. When stable movements of the aircraft cannot be sufficiently guaranteed, the captured images will be distorted. Therefore, there is usually a lot of work in inertial navigation system, image correction, flight attitude correction, image splicing and flight speed, leading to large technical difficulty and large complication in specific industry application. However, if rotorcraft is used as a platform of the imaging device, the flight attitude of the rotorcraft is controlled by wireless transmission, so that the rotorcraft flies to and stops at a designated area before the hyperspectral image is collected.

When the imaging system with the slit scanning mode is mounted on the rotor unmanned aerial vehicle, the two-dimensional translation mechanism will drive the imaging spectrometer and the plane array detector to move on a one-dimensional space (motion scan dimension), so that the whole imaging system on the rotor unmanned aerial vehicle will shift its center of gravity as the scanning mechanism runs. Before the rotor unmanned aerial vehicle takes off, the imaging system is in the absence of running and completes the focus of debugging with three-axis brushless holder. During data acquisition in the air, the center of gravity of the imaging spectrometer will shift, causing the image to be distorted.

When the imaging system of the rotary mirror scanning mode is mounted on the rotor unmanned aerial vehicle, the mode can avoid the instability caused by the unmanned aerial flight (affected by airflow, wind and other environmental effects) and the deviation of the system due to shift of the center of gravity (when the slit scanning mode is carried out, the center of gravity of the system will shift due to the progress of the scanning). However, the rotary mirror is circularly centered on the center axis, and line speeds are not the same when the rotary mirror is mapped to the target objects of different distances, wherein line speeds of the rotary mirror at beginning and end of the image acquisition are larger, while those at a middle part of the image acquisition are small, resulting in image distortion due to such inconsistent speeds.

Therefore, it is urgent to provide a novel hyperspectral imaging system that can solve the problem of image distortion.

SUMMARY OF THE PRESENT INVENTION

An object of the present invention is to provide a lens scanning mode hyperspectral imaging system and a rotor unmanned aerial vehicle for solving image distortion problems of conventional hyperspectral imaging systems, suitable for an environment with a high altitude and a large scanning range.

Accordingly, in order to accomplish the above objects, the present invention provides:

a lens scanning mode hyperspectral imaging system, comprising: an imaging lens, an imaging spectrometer and a surface array detector arranged in sequence and coaxial to a main optic axis, wherein the imaging spectrometer and the surface array detector are connected and mounted to each other; wherein the lens scanning mode hyperspectral imaging system further comprises: a driving device for driving the imaging lens to translate relative to a plane where a slit of the imaging spectrometer is; the imaging lens forms a lens scanning mode during translating, and a scanning distance is 10±2 mm.

In the conventional hyperspectral imaging system, in order to ensure that the lens field of view and the captured image field of view will not change, the imaging lens is fixed no matter with a slit scanning mode or a rotary mirror scanning mode, However, both of the scanning modes will lead to image distortion. Based on the fact that the imaging spectrometer and the surface array detector are fixed, the present invention horizontally moves the imaging lens relative to the plane where the slit of the imaging spectrometer is, so as to form the lens scanning mode. The imaging system forms an image of one line of a target for each time, and the incident light entering the slit is split by the imaging spectrometer, wherein the spectroscope splits each spectral component to correspond to a pixel on a line array of the plane array detector. Therefore, in order to present all images of a target object in the plane array detector, a relative movement is needed between the target object and the imaging system. The invention realizes the relative movement between the target object and the imaging spectrometer by the lens scanning mode for imaging while overcoming shift of a center of gravity during the slit scanning mode due to movement of the imaging spectrometer and image distortion during the rotary mirror scanning mode due to inconsistency of scanning speeds.

For the lens scanning mode, movement of the lens will lead to that the lens moves a certain displacement each time, target scenes captured by the surface array detector are different. However, in the case of the high altitude and the large scanning range, for example, when the hyperspectral imaging system is used for scanning with a rotor unmanned aerial vehicle, a flying height of the unmanned aerial vehicle is usually several hundred meters, and a width of the target object actually taken on the ground is usually over a hundred meter. According to the present invention, the scanning distance of the imaging lens is set at 10±2 mm. That is to say, the movement of the imaging lens is very small, and the spatial resolution for capturing the target object is much larger than the pixel size of the surface array detector, so as to ensure that the target object location imaging corresponds to the pixel information of the surface array detector. That is to say, for the target object with the width over a hundred meter, the change of the captured image field of view can basically be ignored, namely location information of the target object is basically the same.

The driving device comprises: a translation mechanism mounted to the imaging lens, and a scanning motor for driving the translation mechanism. The translation mechanism is driven by the scanning motor, so as to drive the imaging lens to scan. After scanning, the scanning motor resets the translation mechanism.

The translation mechanism comprises: a fixing board on a top of the translation mechanism, a sliding rail fixedly connected to the fixing board, and a slider movable along the sliding rail, wherein the slider is connected to the imaging lens through an imaging lens fixer. The imaging lens is driven to scan by the sliding rail and the slider, which provides a simple structure and convenient operation, and is conducive to lowering costs.

The slider is connected to the imaging lens fixer through an adapter. When moving along the sliding rail, the slider waggles, and the adapter is conducive to reducing an impact of the waggling slider on the imaging lens, so as to enhance stabilization of imaging lens scanning.

The scanning motor is fixedly connected to the fixing board through a scanning motor fixer, and an output shaft of the scanning motor is connected to and drives the adapter. If the scanning motor directly drives the slider or the imaging lens, the slider or the imaging lens will waggle when the scanning motor converts rotation to translation, which affects stable imaging. By driving the adapter to move with the scanning motor, stability of lens scan will be significantly improved.

The imaging spectrometer is connected to the surface array detector through a fixer, and is fixed through an imaging spectrometer fixer. In practice, the hyperspectral imaging system may be installed in a shell, and the imaging spectrometer and the surface array detector are mounted to the shell.

The lens scanning mode hyperspectral imaging system further comprises: an auxiliary camera for remotely monitoring image acquisition areas and qualities. The auxiliary camera is capable of real-time monitoring the image acquisition areas, and detecting the imaging qualities, which is conducive to accuracy of imaging.

An NUC (next unit of computing) motherboard is established on a top of the lens scanning mode hyperspectral imaging system through a supporting pole. The NUC motherboard is used to control data acquisition software and store data, wherein a ground operator remotely controls the NUC motherboard, in such a manner that real-time collected data do not need to be remotely transmitted to the ground, and can be outputted and processed after testing. The NUC motherboard is established on the top of the lens scanning mode hyperspectral imaging system through the supporting pole to save space.

The present invention also provides a rotor unmanned aerial vehicle, comprising an unmanned aerial vehicle and a control module for controlling the unmanned aerial vehicle, wherein a hyperspectral imaging system is installed in the unmanned aerial vehicle. The hyperspectral imaging system is mounted on the unmanned aerial vehicle and the flight attitude of the unmanned aerial vehicle is remotely controlled so that the unmanned aerial vehicle can fly and stop at the designated area, and then the hyperspectral imaging system uses a lens scanning method for image acquisition, which solves instability of the center of gravity caused by adjusting a scanning range with movement of the unmanned aerial vehicle, so as to avoid image distortion. In addition, hyperspectral remote sensing with the unmanned aerial vehicle is able to quickly complete scanning and stitching of a large area of a target image. Meanwhile, the unmanned aerial vehicle provides relevant GPS positioning information, and together with ground indicators, scanning and stitching of an even larger area of the target image are able to be completed soon. There is no need for real-time adjusting unmanned aerial vehicle flight attitude, speed, etc., because during hyperspectral imaging, the unmanned aerial vehicle is suspended in the air, and the hyperspectral imaging carried will complete image scanning and acquisition under control of a computer.

The hyperspectral imaging system is connected to the unmanned aerial vehicle through a three-axis stabilization holder. The three-axis stabilization holder ensures stability of the hyperspectral imaging system during flight of the unmanned aerial vehicle.

In view of the above, the advantageous effects of the present invention are as follows:

1. the hyperspectral imaging system of the present invention provides relative motion between the target object and the imaging spectrometer by means of the lens scanning mode to achieve imaging, which solves the image distortion problem of conventional hyperspectral imaging system using a slit scanning mode or a scanning mode, and is suitable for the environment with the high altitude and the large scanning range;

2. the hyperspectral imaging system of the present invention overcomes the technical bias in the prior art that the imaging lens must be fixed, wherein in the environment with the high altitude and the large scanning range, a change of a field of view of an image caused by the imaging lens is very small within the scanning distance range of 10±2 mm, and position information of the target object is basically unchanged, which will not affect a final image quality;

3. the lens scanning mode of the present invention can also be applied to other non-hyperspectral imaging modes, and the information acquisition can also be performed; in this case, image information and spectral information are no longer acquired, but only the spectral information of the target is obtained, which is conducive to enlarging an application field;

4. by carrying the hyperspectral imaging system, the unmanned aerial vehicle can fly and stop at the designated area, and then the hyperspectral imaging system uses the lens scanning method for image acquisition, which solves instability of the center of gravity caused by adjusting a scanning range with movement of the unmanned aerial vehicle, so as to avoid image distortion;

5. according to the present invention, costs of a rotor unmanned aerial vehicle carrying platform are low, wherein the platform can be control by a wireless transmission and remote control module, and the image acquisition areas, the attitude of the rotor unmanned aerial vehicle and the captured image effects can be observed on the group; in addition, the unmanned aerial vehicle can also quickly complete shooting and stitching of a large area of the target image; meanwhile, the unmanned aerial vehicle provides relevant GPS positioning information, and together with ground indicators, shooting and stitching of an even larger area of the target image are able to be completed soon, so there is no need for real-time adjusting unmanned aerial vehicle flight attitude, speed, etc.

6. the present invention does not need very professional persons to operate, and only person able to control the flight attitude of the unmanned aerial vehicle is needed, wherein due to automation and modularization of image acquisition, test efficiency is greatly improved;

7. according to the present invention, flight control, attitude of the three-axis stabilization holder, and work of the hyperspectral imaging system are relatively independent, and there is no need to debug the system during testing, wherein only the rotor unmanned aerial vehicle needs to be individually controlled to fly and stop to the designated area with simple operation.

These and other objectives, features, and advantages of the present invention will become apparent from the following detailed description, the accompanying drawings, and the appended claims.

Element reference: 1—imaging lens, 2—imaging lens fixer, 3—slit, 4—adapter, 5—imaging spectrometer, 6—supporting pole, 7—imaging spectrometer fixer, 8—fixer, 9—surface array detector, 10—NUC mother board, 11—fixing board, 12—scanning motor, 13—scanning motor fixer, 14—auxiliary camera, 15—sliding rail, 16—slider, 01—unmanned aerial vehicle, 02—three-axis stabilization holder, 03—hyperspectral imaging system.

DETAILED DESCRIPTION OF THE PREFERRED EMBODIMENT

All features disclosed in the specification, except for mutually exclusive features and/or steps, may be combined in any manner.

Figure 1:
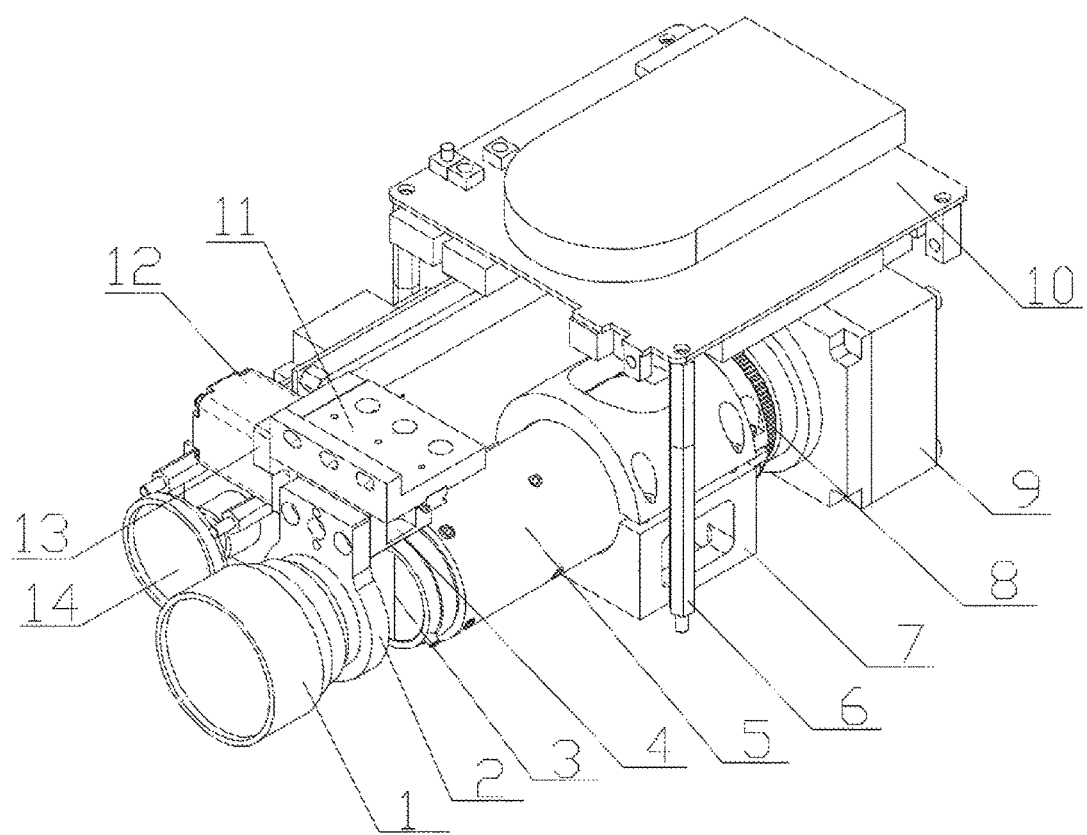
FIG. 1 is a structural view of a hyperspectral imaging system according to the present invention.
Figure 2:
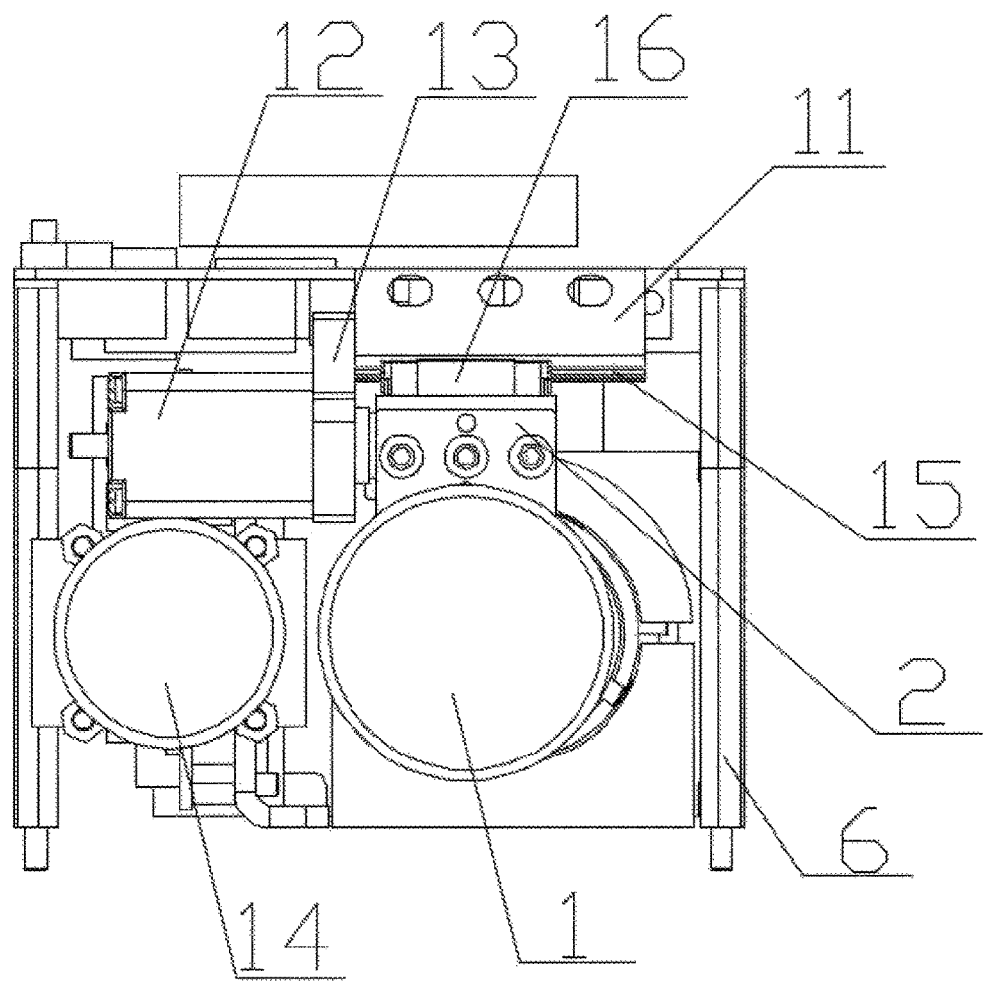
FIG. 2 is a side view of the hyperspectral imaging system according to the present invention.
Figure 3:
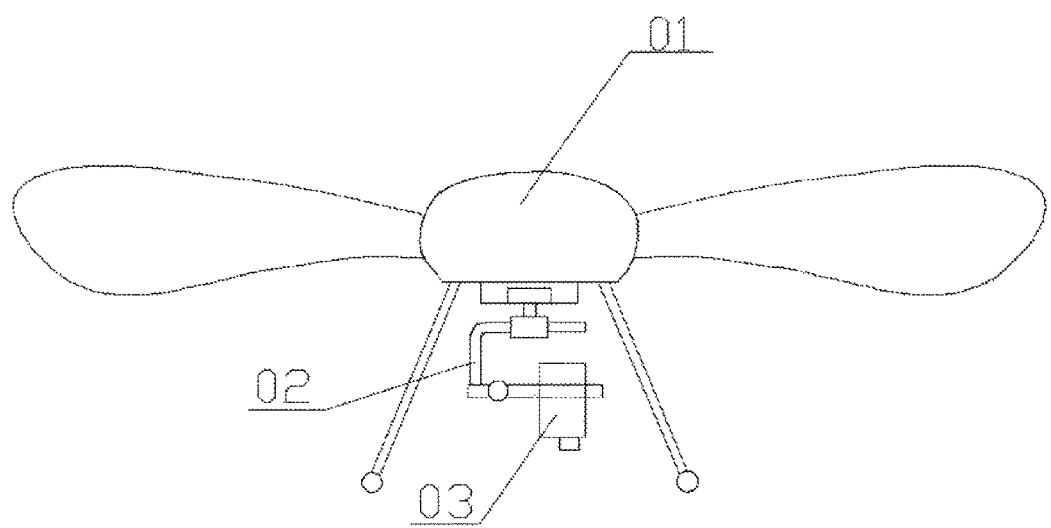
FIG. 3 is a structural view of a rotor unmanned aerial vehicle according to the present invention.

Referring to FIG. 1 of the drawings, the present invention is further illustrated.

Persons in the art will understand that imaging lens, imaging spectrometer, surface array detector, NUC mother board, auxiliary camera, unmanned aerial vehicle, control module for controlling flight of the unmanned aerial vehicle, and three-axis stabilization holder used in the present invention are all conventional technologies.

Embodiment 1

A lens scanning mode hyperspectral imaging system is provided, comprising: an imaging lens 1, an imaging spectrometer 5 and a surface array detector 9 arranged in sequence and coaxial to a main optic axis, wherein the imaging spectrometer 5 and the surface array detector 9 are connected and mounted to each other; wherein the lens scanning mode hyperspectral imaging system further comprises: a driving device for driving the imaging lens 1 to translate relative to a plane where a slit 3 of the imaging spectrometer 5 is; the imaging lens 1 forms a lens scanning mode during translating, and a scanning distance is 10±2 mm.

In the conventional hyperspectral imaging system, in order to ensure that the lens field of view and the captured image field of view will not change, the imaging lens 1 is fixed no matter with a slit scanning mode or a rotary mirror scanning mode, However, both of the scanning modes will lead to image distortion. Based on the fact that the imaging spectrometer 5 and the surface array detector 9 are fixed, the present invention horizontally moves the imaging lens 1 relative to the plane where the slit 3 of the imaging spectrometer 5 is, so as to form the lens scanning mode. The imaging system forms an image of one line of a target for each time, and the incident light entering the slit 3 is split by the imaging spectrometer 5, wherein the spectroscope splits each spectral component to correspond to a pixel on a line array of the plane array detector. Therefore, in order to present all images of a target object in the plane array detector, a relative movement is needed between the target object and the imaging system. The invention realizes the relative movement between the target object and the imaging spectrometer 5 by the lens scanning mode for imaging while overcoming shift of a center of gravity during the slit scanning mode due to movement of the imaging spectrometer and image distortion during the rotary mirror scanning mode due to inconsistency of scanning speeds.

For the lens scanning mode, movement of the lens will lead to that the lens moves a certain displacement each time, target scenes captured by the surface array detector are different. However, in the case of the high altitude and the large scanning range, for example, when the hyperspectral imaging system is used for shooting with a rotor unmanned aerial vehicle, a flying height of the unmanned aerial vehicle is usually several hundred meters, and a width of the target object actually taken on the ground is usually over a hundred meter. According to the present invention, the scanning distance of the imaging lens is set at 10±2 mm. That is to say, the movement of the imaging lens is very small, and the spatial resolution for capturing the target object is much larger than the pixel size of the surface array detector, so as to ensure that the target object location imaging corresponds to the pixel information of the surface array detector. That is to say, for the target object with the width over a hundred meter, the change of the captured image field of view can basically be ignored, namely location information of the target object is basically the same.

For example, an imaging field angle of the hyperspectral imaging system is 29°, and full-frame pixels of the surface array detector are 1936×1456 spatial dimension×spectral dimension. In practical use, considering problems such as invalid data acquisition and a plurality of wave bands, the surface array detector is processed with pixel merging, and a 960×360 mode is selected for acquisition, for maintaining enough wave bands while improving acquisition efficiency. During 300 m-high-altitude imaging, if the imaging lens 1 has a 10 mm offset in the system, actual shooting width for a target object on the ground is 150 m, and a corresponding space scale of each pixel of a camera is: 150 m/969 camera pixels=15.5 cm. For shooting a 150 m-wide target object, an offset of a relative position of the target object is far less than a spatial resolution of each pixel, so change of image field of view can be ignored.

Embodiment 2

Based on the embodiment 1, the driving device comprises: a translation mechanism mounted to the imaging lens 1, and a scanning motor 12 for driving the translation mechanism. The translation mechanism is driven by the scanning motor 12, so as to drive the imaging lens 1 to scan. After scanning, the scanning motor 12 resets the translation mechanism.

Embodiment 3

Based on the embodiment 2, the translation mechanism comprises: a fixing board 11 on a top of the translation mechanism, a sliding rail 15 fixedly connected to the fixing board 11, and a slider 16 movable along the sliding rail 15, wherein the slider 16 is connected to the imaging lens 1 through an imaging lens fixer 2. The imaging lens 1 is driven to scan by the sliding rail 15 and the slider 16, which provides a simple structure and convenient operation, and is conducive to lowering costs.

Embodiment 4

Based on the embodiment 3, the slider 16 is connected to the imaging lens fixer 2 through an adapter 4. When moving along the sliding rail 15, the slider 16 waggles, and the adapter 4 is conducive to reducing an impact of the waggling slider 16 on the imaging lens 1, so as to enhance stabilization of imaging lens scanning.

Embodiment 5

Based on the embodiment 4, the scanning motor 12 is fixedly connected to the fixing board 11 through a scanning motor fixer 13, and an output shaft of the scanning motor 12 is connected to and drives the adapter 4. If the scanning motor 12 directly drives the slider 16 or the imaging lens 1, the slider 16 or the imaging lens 1 will waggle when the scanning motor 12 converts rotation to translation, which affects stable imaging. By driving the adapter 4 to move with the scanning motor 12, stability of lens scan will be significantly improved.

Embodiment 6

Based on the above embodiments, the imaging spectrometer 5 is connected to the surface array detector 9 through a fixer 8, and is fixed through an imaging spectrometer fixer 7. In practice, the hyperspectral imaging system may be installed in a shell, and the imaging spectrometer 5 and the surface array detector 9 are mounted to the shell.

Embodiment 7

Based on the above embodiments, the lens scanning mode hyperspectral imaging system further comprises: an auxiliary camera 14 for remotely monitoring image acquisition areas and qualities. The auxiliary camera 14 is capable of real-time monitoring the image acquisition areas, and detecting the imaging qualities, which is conducive to accuracy of imaging.

Embodiment 8

Based on the above embodiments, an NUC motherboard 10 established on a top of the lens scanning mode hyperspectral imaging system through a supporting pole 6. The NUC motherboard 10 is used to control data acquisition software and store data, wherein a ground operator remotely controls the NUC motherboard 10, in such a manner that real-time collected data do not need to be remotely transmitted to the ground, and can be outputted and processed after testing. The NUC motherboard 10 is established on the top of the lens scanning mode hyperspectral imaging system through the supporting pole 6 to save space.

Embodiment 9

A rotor unmanned aerial vehicle is provided, comprising an unmanned aerial vehicle 01 and a control module for controlling the unmanned aerial vehicle 01, wherein a hyperspectral imaging system 03 is installed in the unmanned aerial vehicle 01. The hyperspectral imaging system 03 is mounted on the unmanned aerial vehicle 01 and the flight attitude of the unmanned aerial vehicle 01 is remotely controlled so that the unmanned aerial vehicle 01 can fly and stop at the designated area, and then the hyperspectral imaging system 03 uses a lens scanning method for image acquisition, which solves instability of the center of gravity caused by adjusting a scanning range with movement of the unmanned aerial vehicle 01, so as to avoid image distortion. In addition, hyperspectral remote sensing with the unmanned aerial vehicle 01 is able to quickly complete shooting and stitching of a large area of a target image. Meanwhile, the unmanned aerial vehicle 01 provides relevant GPS positioning information, and together with ground indicators, shooting and stitching of an even larger area of the target image are able to be completed soon. There is no need for real-time adjusting unmanned aerial vehicle flight attitude, speed, etc., because during hyperspectral imaging, the unmanned aerial vehicle 01 is suspended in the air, and the hyperspectral imaging carried will complete image scanning and acquisition under control of a computer.

The hyperspectral imaging system 03 is connected to the unmanned aerial vehicle 01 through a three-axis stabilization holder 02. The three-axis stabilization holder 02 ensures stability of the hyperspectral imaging system 03 during flight of the unmanned aerial vehicle 01.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A lens scanning mode hyperspectral imaging system, comprising: an imaging lens (1), an imaging spectrometer (5) and a surface array detector (9) arranged in sequence and coaxial to a main optic axis, wherein the imaging spectrometer (5) and the surface array detector (9) are connected and mounted to each other; wherein the lens scanning mode hyperspectral imaging system further comprises: a driving device for driving the imaging lens (1) to translate relative to a plane where a slit (3) of the imaging spectrometer (5) is; the imaging lens (1) forms a lens scanning mode during translating, and a scanning distance is 10±2 mm;

wherein the driving device comprises: a translation mechanism mounted to the imaging lens (1), and a scanning motor (12) for driving the translation mechanism;

wherein the translation mechanism comprises: a fixing board (11) on a top of the translation mechanism, a sliding rail (15) fixedly connected to the fixing board (11), and a slider (16) movable along the sliding rail (15), wherein the slider (16) is connected to the imaging lens (1) through an imaging lens fixer (2).

2. The lens scanning mode hyperspectral imaging system, as recited in claim 1, wherein the slider (16) is connected to the imaging lens fixer (2) through an adapter (4).

3. The lens scanning mode hyperspectral imaging system, as recited in claim 2, wherein the scanning motor (12) is fixedly connected to the fixing board (11) through a scanning motor fixer (13), and an output shaft of the scanning motor (12) is connected to and drives the adapter (4).

4. The lens scanning mode hyperspectral imaging system, as recited in claim 1, wherein the imaging spectrometer (5) is connected to the surface array detector (9) through a fixer (8), and is fixed through an imaging spectrometer fixer (7).

5. The lens scanning mode hyperspectral imaging system, as recited in claim 2, wherein the imaging spectrometer (5) is connected to the surface array detector (9) through a fixer (8), and is fixed through an imaging spectrometer fixer (7).

6. The lens scanning mode hyperspectral imaging system, as recited in claim 3, wherein the imaging spectrometer (5) is connected to the surface array detector (9) through a fixer (8), and is fixed through an imaging spectrometer fixer (7).

7. The lens scanning mode hyperspectral imaging system, as recited in claim 1, further comprising: an auxiliary camera (14) for remotely monitoring image acquisition areas and qualities.

8. The lens scanning mode hyperspectral imaging system, as recited in claim 2, further comprising: an auxiliary camera (14) for remotely monitoring image acquisition areas and qualities.

9. The lens scanning mode hyperspectral imaging system, as recited in claim 3, further comprising: an auxiliary camera (14) for remotely monitoring image acquisition areas and qualities.

10. The lens scanning mode hyperspectral imaging system, as recited in claim 8, wherein an NUC motherboard (10) is established on a top of the lens scanning mode hyperspectral imaging system through a supporting pole (6).

11. The lens scanning mode hyperspectral imaging system, as recited in claim 9, wherein an NUC motherboard (10) is established on a top of the lens scanning mode hyperspectral imaging system through a supporting pole (6).

* * * * *